(12) United States Patent
Myers et al.

(10) Patent No.: US 11,009,449 B2
(45) Date of Patent: May 18, 2021

(54) SCANNING TRAJECTORIES FOR REGION-OF-INTEREST TOMOGRAPH

(71) Applicant: FEI Company, Hillsboro, OR (US)

(72) Inventors: Glenn Myers, Waramanga (AU); Shane Latham, Griffith (AU); Adrian Sheppard, Fisher (AU); Olaf Delgado-Friedrichs, Turner (AU); Andrew Kingston, Kambah (AU)

(73) Assignee: FEI Company, Hillsboro, OR (US)

( * ) Notice: Subject to any disclaimer, the term of this patent is extended or adjusted under 35 U.S.C. 154(b) by 246 days.

(21) Appl. No.: 16/359,352

(22) Filed: Mar. 20, 2019

(65) Prior Publication Data
US 2019/0323946 A1 Oct. 24, 2019

Related U.S. Application Data

(60) Provisional application No. 62/660,433, filed on Apr. 20, 2018.

(51) Int. Cl.
| | |
|---|---|
| *G06K 9/00* | (2006.01) |
| *G01N 21/17* | (2006.01) |
| *G06T 7/20* | (2017.01) |
| *G06T 7/571* | (2017.01) |
| *G01N 21/88* | (2006.01) |

(52) U.S. Cl.
CPC ......... *G01N 21/17* (2013.01); *G01N 21/8851* (2013.01); *G06T 7/20* (2013.01); *G06T 7/571* (2017.01); *G01N 2021/1765* (2013.01); *G01N 2021/1787* (2013.01); *G01N 2201/11* (2013.01); *G06T 2207/10081* (2013.01); *G06T 2207/30241* (2013.01)

(58) Field of Classification Search
CPC ............... G01N 21/17; G01N 21/8851; G01N 2021/1765; G01N 2201/11; G01N 2021/1787; G01N 2223/306; G01N 23/046; G06T 7/20; G06T 7/571; G06T 2207/30241; G06T 2207/10081
See application file for complete search history.

(56) References Cited

U.S. PATENT DOCUMENTS 5,164,975 A * 11/1992 Steinmeyer ............... G21K 1/06
378/145
5,949,844 A * 9/1999 Watanabe .......... G02B 17/0605
378/34
(Continued)

*Primary Examiner* — Solomon G Bezuayehu

(57) ABSTRACT

Apparatuses and methods for implementing scanning trajectories for ROI tomography are disclosed herein. An example method includes determining a first focus object distance based on a circumradius of a sample, the sample including a region of interest, determining a second focus object distance based on a radius of a smallest cylinder that contains the region of interest, determining a plurality of viewing angles from a plurality of possible viewing angles in response to the first focus object distance, where each viewing angle of the plurality of viewing angles has an associated focus object distance measured from the region of interest, and where the associated focus object distance of each of the plurality of viewing angles is less than the first focus object distance and greater than the second focus object distance, and scanning the region of interest using at least the plurality of viewing angles.

20 Claims, 8 Drawing Sheets

(56) References Cited

U.S. PATENT DOCUMENTS

| | | | | |
|---|---|---|---|---|
| 5,960,056 | A * | 9/1999 | Lai | A61B 6/032 378/15 |
| 7,864,415 | B2 * | 1/2011 | McNulty | G21K 1/06 359/370 |
| 2002/0176537 | A1 * | 11/2002 | Feldmesser | G21K 1/025 378/154 |
| 2011/0096896 | A1 * | 4/2011 | Kunzmann | G01N 23/046 378/21 |
| 2015/0146936 | A1 * | 5/2015 | Mezghani | G06T 5/006 382/109 |
| 2018/0005415 | A1 * | 1/2018 | Wang | G06T 11/006 |

* cited by examiner

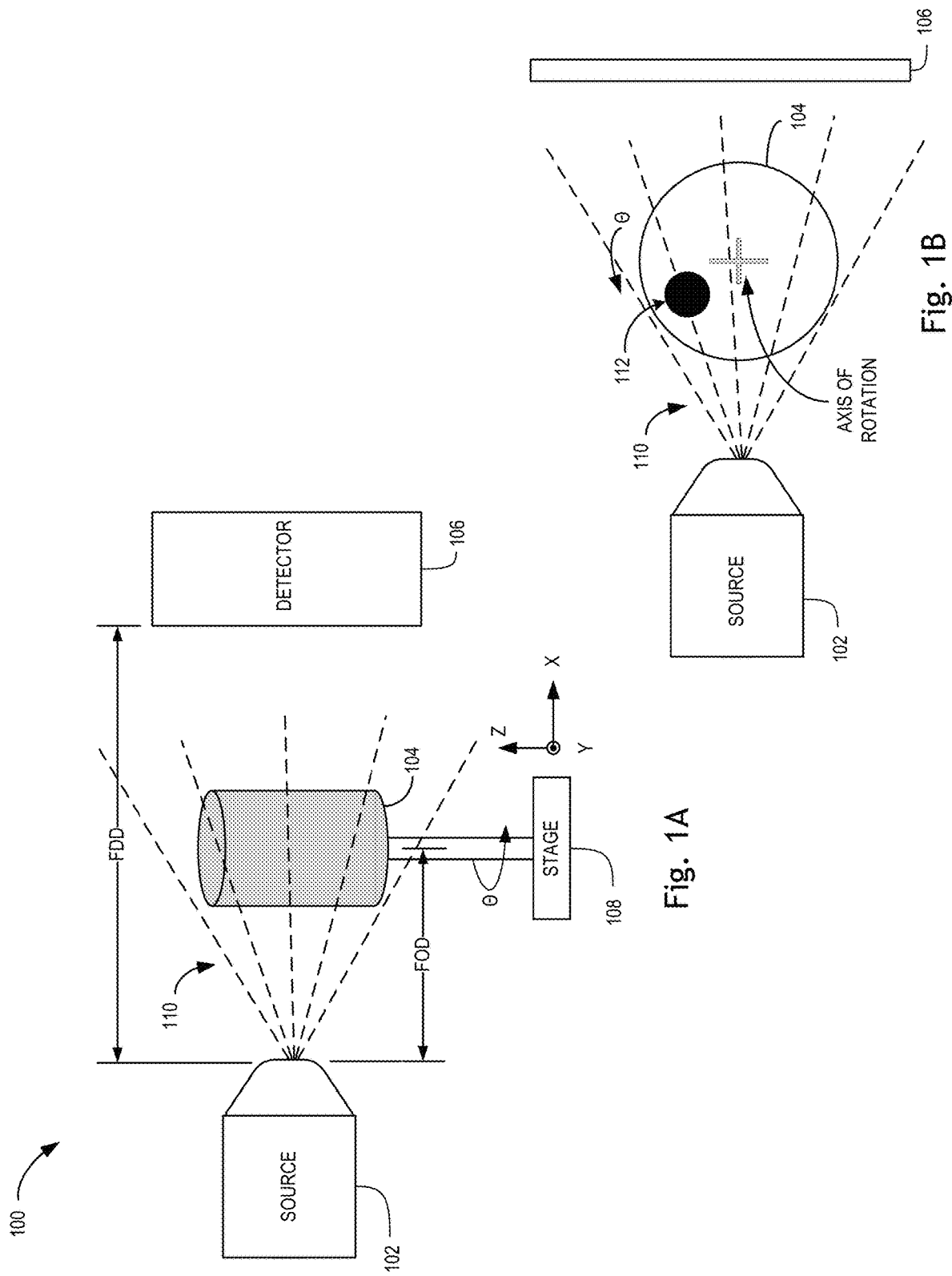

409

411
Selecting a first plurality of viewing angles based on a location of a region of interest within a sample, a relationship between the first plurality of viewing angles and the location of the region of interest within the sample allowing for the minimization of a first focus object distance.

413
Scanning a region of interest within a sample with a first scan trajectory at a first focus object distance, the first scan trajectory includes a first plurality of viewing angles of the sample.

415
Minimizing the first focus object distance for at least one viewing angle of the first plurality of viewing angles.

417
Excluding a subset of the first plurality of viewing angles from scanning the region of interest based on the subset of the first plurality of viewing angles having an associated first focus object distance that cannot be minimized with respect to a second focus object distance.

419
Scanning the sample with a second scan trajectory, the second scan trajectory completing a second plurality of viewing angles of the sample at a second focus object distance, where the first focus object distance is less than the second focus object distance.

```
┌─────────────────────────────────────────────────────────────────────┐
│ Determining a first focus object distance based on a circumradius   │
│ of a sample, the sample including a region of interest              │
│                                                                     │
│                              503                                    │
└─────────────────────────────────────────────────────────────────────┘
                                  ↓
┌─────────────────────────────────────────────────────────────────────┐
│ Determining a second focus object distance based on a radius of a   │
│ smallest cylinder that contains the region of interest              │
│                                                                     │
│                              505                                    │
└─────────────────────────────────────────────────────────────────────┘
                                  ↓
┌─────────────────────────────────────────────────────────────────────┐
│ Determining a plurality of viewing angles from a plurality of       │
│ possible viewing angles in response to the first focus object       │
│ distance, wherein each viewing angle of the plurality of viewing    │
│ angles has an associated focus object distance measured from the    │
│ region of interest, and wherein the associated focus object         │
│ distance of each of the plurality of viewing angles is less than    │
│ the first focus object distance and greater than the second focus   │
│ object distance                                                     │
│                                                                     │
│                              507                                    │
└─────────────────────────────────────────────────────────────────────┘
                                  ↓
┌─────────────────────────────────────────────────────────────────────┐
│ Scanning the region of interest using at least the plurality of     │
│ viewing angles                                                      │
│                                                                     │
│                              509                                    │
└─────────────────────────────────────────────────────────────────────┘
```

Fig. 5

SCANNING TRAJECTORIES FOR REGION-OF-INTEREST TOMOGRAPH

CROSS-REFERENCE TO RELATED APPLICATION

This application claims the priority benefit under 35 U.S.C. § 119(e) of U.S. provisional patent application No. 62/660,433 entitled "Scanning trajectories for region-of-interest tomography" filed on Apr. 20, 2018, the disclosure of which is incorporated herein by reference.

FIELD OF THE INVENTION

This disclosure is generally directed toward computed tomography, and more specifically toward region-of-interest specific scanning trajectories.

BACKGROUND

Computed Tomography (CT) uses x-rays to investigate samples, and includes obtaining data of internal structure. CT-based systems conventionally move, e.g., rotate, the sample and x-ray source and detector relative to one another to obtain images at available viewing angles around a sample. The scan data may then be algorithmically manipulated to obtain reconstructions of various slices of the sample. The resolution of the images may be affected by the distances between the various components, such as the source, sample and detector. For example, in cone-beam CT system, a large distance between the source and sample reduces the quality of the obtained image.

Additionally, a region of interest (ROI) within the sample may require higher resolution data than can be obtained by a typical scan trajectory, e.g., the relative distance between the ROI and the source may affect the x-ray flux due to lower cone angles intersecting the ROI. While potentially acceptable scan resolution of an ROI may be obtainable, higher quality images of an ROI is desirable.

BRIEF DESCRIPTION OF THE DRAWINGS

FIG. 1A is an illustrative schematic of a CT system in accordance with an embodiment of the present disclosure.

FIG. 1B shows a plan view of the source, sample, and detector in accordance with an embodiment of the present disclosure.

FIG. 4 is an example method for performing CT scanning for an ROI in a sample in accordance with an embodiment disclosed herein.

FIG. 5 is an example method for ROI scanning using a reduced set of viewing angles in accordance with an embodiment of the present disclosure.

Like reference numerals refer to corresponding parts throughout the several views of the drawings.

DETAILED DESCRIPTION OF EMBODIMENTS

Figure 1C:
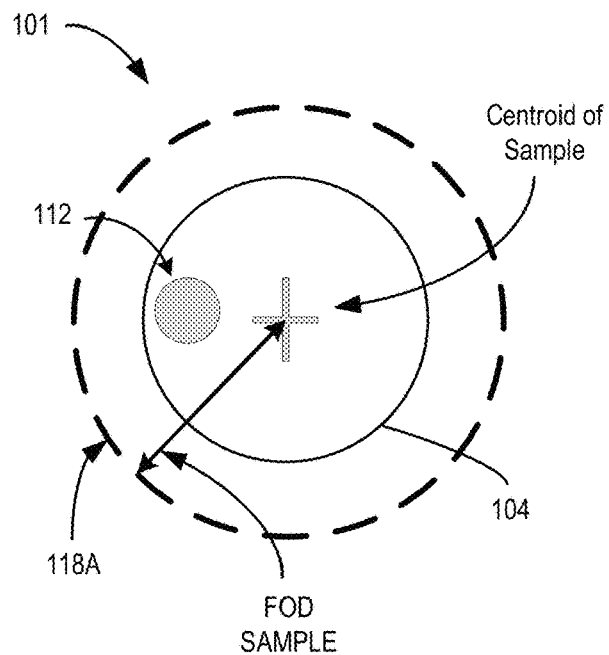
FIG. 1C is an example sample trajectory, and illustrates conventional microCT scanning.

Embodiments of the present invention are described below in the context of a tomographic imaging apparatus for micrometer-scale or nanometer-scale computed tomography (CT) of small objects, in particular cylindrical samples, using a cone-shaped x-ray beam and a circular, helical, or space filling scanning (sample) trajectory to scan regions of interest using viewing angles selected to minimize focus object distances with regards to the region of interest, and to maximize scanning trajectory efficiency. However, it should be understood that the methods described herein are generally applicable to a wide range of different tomographic methods and apparatus, including both cone-beam and parallel beam systems, and are not limited to any particular apparatus type, beam type, object type, length scale, or scanning trajectory As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections.

Laboratory-based CT systems, which may be used to obtain data at micron and/or nanometer scales, are used to image various samples. The samples may be biological, mineral, composite materials, etc., and a resulting image may be a reconstruction of internal structure. In general, a CT system includes an x-ray source and detector with a sample arranged in between. The CT source may emit radiation equally over a large cone, e.g., over wide angles, and the efficiency of the cone-beam tomography increases with higher cone angles incident on the sample. The increase in efficiency may mostly be due to an increase in x-ray flux incident on the sample. In some embodiments, higher cone angles may be obtained using small distances between the source and the sample. As noted, these CT systems either rotate the sample with respect to the source and detector, or equivalently rotate the source and detector in concert around the sample. Various physical constraints may affect one or more of the resolution, signal to noise ratio, and quality of the obtained scan, such as the shape of the sample, the distance from the source to the sample, the distance from the source to the detector, the distance from the sample to the detector, and combinations thereof. These relative distances affect an amount of an x-ray beam cone that passes through the sample or a portion of the sample, and intersects with the detector. More specifically, the distances between the components affect the amount of x-ray flux passing through the sample and impinging on the detector. The amount of flux passing through the sample and incident on the detector is one major aspect of data resolution and quality. As such, a large distance between the source and sample, and source and detector may result in a reduction in scan quality, whereas small distances may result in higher scan quality.

Other factors of the sample may also affect the quality, e.g., the signal to noise ratio (SNR) or resolution, of the scan. In general, the size, shape and location of an ROI within a sample and the relative distances from the ROI to the source and detector may affect the quality of the scan of the ROI. An ROI on the axis of rotation of a sample may receive less flux from the source due to the distance, which may result in a poor quality scan/projection of the ROI. The distance affects the cone angle incident on the ROI, which results in a reduction in x-ray flux traversing the ROI and incident on the detector. The amount of flux incident on the ROI and collected by the detector affects the quality of the scan, e.g., the SNR and resolution of the scan. As used herein and in the context of ROI scanning, "cone angle" may be referred to as the angle subtended by the ROI.

In some embodiments, if an ROI is not located on the axis of motion of the sample (or the axis of rotation of the source-detector pair), then the quality of the reconstructed image of the ROI may be limited. For example, if the ROI is displaced radially from the original (sample) axis of rotation and constrained in a region close to one surface of the sample (see 112 of FIG. 1B, for example), then the flux of x-rays passing through the ROI will be different due to the changing distance between the ROI and the source as the sample and/or source/detector move. For example, when the ROI is opposite the source, the data from these x-rays will be of lower intensity than when the ROI is adjacent the source due to a reduction in the flux of x-rays traversing the ROI. The x-ray flux may be reduced due to a reduction in cone angle, which is reduced due to the distance between the source and the ROI. The reduction of x-ray flux through the ROI may affect the obtained image quality. In some embodiments, the location of the full-sample rotation axis will be closest to the center of the sample so as to minimize sample wobble during acquisition and allow it to most conveniently fill the detector (see FIG. 1E). In some embodiments, however, the ROI is placed on the axis of rotation, which may cause the sample to rotate more like a hula hoop around an axis, e.g., eccentric rotation, where the center of the sample may move in a circular or helical path, which may affect the distance between the source and sample to avoid interference between the two (see FIG. 1F). Thus, a technique for increasing the image quality of ROI scanning is desired.

With regards to image reconstruction, standard filtered backprojection (FBP) techniques are based on inversion formulas for the Radon transform and can on be applied on a very small set of regular trajectories: they are only directly applicable for circular and helical trajectories that are evenly and densely sampled. For other trajectories the reconstructions contain severe artifacts, e.g. trajectories with more sparse or variable angular sampling, or variation in focus-detector-distance (FDD) or focus-object-distance (FOD). With regards to ROI scanning, the FOD may be the focus-ROI-distance. Iterative reconstruction techniques (IRTs) are able to reconstruct from sparser, less complete or less regular data, however this comes at a cost of being, typically, more than an order of magnitude slower in computation time than FBP methods. Generally, IRTs are either very slow and robust, or fast and unreliable. Even using IRTs, incomplete trajectories will result in lower-quality reconstructions.

Recent work has identified fast iterative methods, preconditioned by a back-projection filter (BPF) and further accelerated by multi-grid methods. These techniques are applicable to a much wider range of trajectories than FBP methods but they are likely to be sensitive to asymmetries and incompleteness. The combination of the trajectories being proposed here and the BPF reconstructions appears to be particularly favorable for producing high quality ROI data with reasonable computational effort. The trajectories disclosed herein may not work with FBP reconstructions, but should produce higher quality data with either IRT or BPF than other ROI trajectories.

One solution may include determining a minimum FOD based on a circumradius of the sample and scanning the ROI using only those viewing angles that satisfy a relationship with respect to the minimum FOD. The circumradius is determined based on placing the sample with the ROI aligned to the axis of rotation of the scanning system. As noted, a sample mounted as such will have an eccentric rotation and requires the source and detector to be placed so that collision with the sample is avoided. This configuration, however, conventionally increases the FOD, which reduces image quality. However, an ROI-centric scan can be performed using fewer viewing angles than all possible viewing angles, and the implemented viewing angles will be selected to increase scanning efficiency, which may be increased based on the determined minimum FOD. It should be noted that scanning efficiency is approximate to an inverse of the FOD. One technique for selecting the implemented viewing angles is to select those viewing angles having a mean square ROI-based FOD that is less than the minimum FOD. In some embodiments, this may result in the implemented viewing angles including a plurality of viewing angles selected on a side of the sample closest to the ROI, which may result in the scanning trajectory oscillating partially around the sample in that vicinity in an arc or in a zig zag type pattern. While some of the viewing angles may have associated FOD greater than the minimum FOD, the mean square of the FOD distances will be less than the minimum FOD. In other embodiments, the mean square FOD distance may be weighted by the time spent acquiring data at each of the selected viewing angle.

Another solution may involve multiple scans of the sample, with one scan using a trajectory that including a relatively complete set of viewing angles and/or the entire sample, while another scan has a limited trajectory or a smaller set of viewing angles. As used herein, "a set of viewing angles" refers to the locations around the sample where the projections (x-ray gray-scale measurements of the sample) are obtained, which may be determined by the implemented trajectory. For example, the other scan may use a reduced trajectory while the first scan may use a fuller trajectory. The reduced trajectory may allow for the distance between the source and ROI to be reduced, e.g., a reduction in ROI-based FOD, compared to the FOD of the fuller scan, e.g., sample-based FOD. The reduction in FOD for the ROI-based scan, e.g., the reduced trajectory, may improve the scan efficiency by minimizing the ROI-based FOD. In some embodiments, the distance between the source and detector may also be reduced, but the overall shape of the sample may limit the reduction of that distance in some instances. In some embodiments, the scan trajectory for the other scan, e.g., the second scan, may not make a full revolution around the sample, but instead may make a scan at limited angles centered on the ROI, or limited to an area of the sample where the ROI is closest to the sample surface (see, e.g., FIG. 2B). For example, the limited angles may include a 180° scan, less than 180°, or even scans that miss/omit some angles due to sample shape. The scan may thus keep the source close to the ROI given sample shape constraints in the limited angles used in the trajectory. The data from the two scans may then be combined to provide a high quality reconstruction, e.g., high resolution, improved SNR, etc., of the ROI while still providing context of the ROI in the sample. While such an embodiment is discussed as using two separate scans for ease of discussion, the techniques disclosed herein do not require the use of two completely separate scans. In general, the two scans may be combined into a single trajectory in which the same areas of the sample are viewed on more than one occasion and with differing levels of magnification, FOD, scan time, etc. In some embodiments, the limited scan trajectories implemented herein may result in a reduction of scan time associated with the reduced set of viewing angles.

FIG. 1A is an illustrative schematic of a CT system 100 in accordance with an embodiment of the present disclosure. The CT system 100 may be used to obtain x-ray attenuation data of samples (e.g., projections) and provide image reconstructions in response. The CT system 100 may at least include a source 102, a stage 108, and a detector 106. In some embodiments, the source 102, stage 108, and detector 106 may be coupled to control electronics (not shown) that controls their operation and receives data from at least the detector 106. The CT system 100 may obtain projections, e.g., the x-ray attenuation data (gray-scale data), of a sample 104, which data may then be used to form reconstructions of the sample 104 and/or desired areas within the sample 104. In some embodiments, as shown in FIG. 1B, an ROI 112 within the sample 104 may be the desired area for analysis of CT scan data.

The source 102 may provide x-rays in a cone shape irradiating outward from the source focus point at high cone angles, which may also be referred to as wide cone angles. As used herein, a "high cone angle" defines an angle subtended by the sample or by the ROI at the source 102 focus point. Based on this definition, a low cone angle would be a smaller angle. In general, a high cone angle defines a wider cone, and a low cone angle defines a narrower cone. Additionally, the cone angle used to obtain any given projection is influenced by the relative distances between the source 102, the sample 104, and the detector 106. More specifically, the distance between the source 102 and the sample 104 or a desired region of the sample, e.g., ROI 112, the focus-object-distance (FOD), may influence the amount of the emitted cone of x-rays, e.g., x-ray flux, that are incident on and pass through the sample 104 or the desired region. It should be noted that the FOD may conventionally be defined as the distance from the source to the rotation axis of the sample or the region of interest within the sample, depending on the goal of the scan and how the sample is mounted on the stage 108. In terms of ROI scanning, the ROI-centric FOD is the distance from the source to the center of the ROI, and not necessarily the center of the sample 104. The FOD may determine the average magnification of the ROI (for a given FDD) and the cone angle that the ROI subtends. In general, the smaller the FOD, the more x-ray flux passes through the sample/ROI due to the source 102 emitting radiation isotropically over a very large solid angle, which increases the quality of obtained images/reconstructions. Further, the distance between the source 102 and the detector 106, the focus-detector-distance (FDD), may also affect the quality of the images and reconstructions. In general, a large FDD may result in a low cone angle of x-rays incident upon the detector 106, and a smaller distance may result in a higher cone angle of x-rays incident upon the detector 106. These distances, FOD and FDD, may affect the quality of the scan, and also the field of view (FOV). As noted, in general, the smaller these distances, a higher quality, lower noise scan may be obtained due to an increase in x-ray flux passing through the sample 104 and incident upon the detector 106, and which improves scanning efficiency.

The detector 106 may be positioned to receive x-rays having passed through the sample 104. In some embodiments, the FDD may be minimized based on sample shape and rotation to maximize incident x-ray flux having passed through the sample 102, including the ROI 112. The detector 106 may include a scintillator that generates visible light when irradiated by x-rays, and a CCD, CMOS or amorphous silicon flat panel sensor mounted behind the scintillator that generates image data representing two-dimensional images of the spatial arrangement of scintillations generated by the scintillator. The result being a two-dimensional image or map of x-ray intensity for the x-rays transmitted through the object. As will be appreciated, each of these images contain information on both external and internal structural features of the sample 104, as projected along the directions of x-rays transmitted through the sample 104 to the detector 106.

The stage 108 supports the sample 104. In some embodiments, the stage 108 may be able to rotate either clockwise, counterclockwise, or both (the θ shown in FIG. 1A), and be able to translate in X, Y, and Z directions (positive and negative) as indicated by the reference axes shown in FIG. 1A. In some embodiments, however, the stage 108 may remain fixed while the source 102 and detector 106 rotate around the sample in concert while also translating in the +/−Z directions. The relative movement of the sample 104 and/or the source 102/detector 106 pair may define a "trajectory" used when obtaining scan data, e.g., image data, projection. In fixed-sample trajectory settings, a trajectory refers to the movement of the source 102 around the sample, where the cone of the x-ray flux originates at the source 102. In some embodiments, the trajectory may be two-dimensional, whereas in other embodiments, the trajectory may be three-dimensional. For example, a 2D trajectory may include a circle, e.g., a full revolution, around the sample 104, and a 3D trajectory may include a helix around the sample 104.

Trajectories are performed by the CT system 100 to obtain scan data, e.g., images, projections, of the sample 104 from desired viewing angles. The trajectories may include scan or source trajectories, as discussed above, where the source 102 moves in relation to the sample 104 (regardless of which component is actually moving), and detector trajectories where the relation of the sample 104 and detector 106 changes. While moving along a desired trajectory, either source or detector, the CT system 100 may take images at varying rates that include continuously, semi-continuously, or periodically. Each location a projection is taken may be referred to as a viewing angle. While most trajectories include a relatively complete set of viewing angles, which may for example be a complete revolution around the sample or less, adjusted or abbreviated trajectories including reduced or restricted sets of viewing angles are disclosed herein. The reduced/restricted viewing angles may be used to obtain higher quality data of an ROI, such as the ROI 112, for example. In some embodiments, scans using the reduced or restricted sets of viewing angles may be performed using shorter and/or variable FODs, including FODs that are adjusted based on the ROI and minimized at least with respect to a circumradius of the sample 104.

The adjusted, limited, abbreviated trajectories and reduced/restricted sets of viewing angles may not include a full or even a half revolution, but instead may make a partial revolution of the sample 104, or include projections taken at a small number of discrete viewing angles in an area where an ROI is closest to the surface of the sample 104. In a 2D context, the adjusted trajectory may form an arc around part of the sample 104. Additionally, some additional rotation may be included to account for the cone angle. For example, an arc of 180° (plus a cone angle amount) may be performed during an adjusted trajectory so as to provide 180° of rays through each point in the sample. In some embodiments, the adjusted trajectories may be selected so that during a large part of the trajectory (e.g., during a disproportionality large fraction of the acquisition time) the source point is on the side of the sample where the ROI 112 is closer to the surface. By locating the adjusted trajectory as such, the data from the adjusted trajectory may include as much of the ROI 112 as possible from as close a distance as possible, e.g., reducing/minimizing the FOD for the ROI 112. In general, by adjusting the trajectory to a limited arc around the sample or using a restricted set of viewing angles, the FOD may be minimized. In turn, a minimized FOD may provide a higher quality scan, which may result in images having higher resolution and/or increased SNR. The CT system 100 includes sample positioning stages mounted onto the sample rotation stage, to allow the sample 104 center point (and the ROI 112) to be moved in X and Y relative to the rotation axis of the instrument. In this way, the trajectory may no longer have a single center of rotation; however the source 102, may at all times, be aimed at (or near) the center of the ROI 112 and the detector 106 may be positioned so that the projection of the ROI 112 is centered within the detector 106.

FIG. 1B shows a plan view of the source 102, sample 104, and detector 106 in accordance with an embodiment of the present disclosure. As shown, the ROI 112 may not be concentric to the sample 104, but instead the ROI 112 may be eccentric. With the ROI 112 being eccentric, the relative motion of the sample 104 and the source 102/detector 106 pair may cause the distance from the ROI 112 and the source 102 to change during rotation (see, e.g., FIG. 1C). This change of distance between the ROI 112 and the source 102 may affect the amount of x-ray flux traversing the ROI 112 due to the FOD between the source 102 and the ROI 112 fluctuating. Alternatively, the sample 104 may be mounted such that the ROI 112 is centered on the axis of rotation, which would make the FOD for the ROI 112 constant, but may force the worst case scenario FOD to be implemented due to the shape of the sample 104 (see, e.g., FIG. 1D). In either scenario, the change in x-ray flux, which may be reduced when the distance between the source 102 and the ROI 112 increases, may affect the quality of the projections of the ROI 112.

To improve the image data of the ROI 112, the system 100 may adjust the trajectory/viewing angles used to obtain higher quality scans of the ROI 112 with the adjusted viewing angles selected to minimize the ROI-based FOD. In some embodiments, the system 100 may cause the relative motion of the sample 104 with respect to the source 102/detector 106 pair to be less than a full revolution. For example, the system 100 may use an arc-shaped trajectory and associated viewing angles with the mid-point of the arc located where the ROI 112 is closest to the surface of the sample 104. Additionally, the FOD is reduced so that more x-ray flux propagates through the ROI 112. The reduced FOD may be determined by the system 100 based on a circumradius of the sample 104 when mounted with the ROI 112 on the axis of rotation. Further, the FDD may be reduced as well so as to maintain the resolution in the data acquired from each revolution. The reductions in the FOD and the FDD, however, may be constrained by the shape of the sample 104 so as not to cause the sample 104 to impact either the source 102 or the detector 106. For any given viewing angle, one could consider the 'optimal' FOD and FDD as those that minimize the FOD without causing source-sample interference, and that adjust the FDD such that the ROI fills the detector field of view.

Minimizing the FOD may provide higher quality and higher resolution scan data due to the increase in x-ray flux incident upon and passing through the ROI 112. While data obtained from the adjusted trajectory alone may not fully cover the ROI 112, provide high quality tomographic images of the internal structure of the ROI 112, or provide sufficient data for straightforward reconstruction of the ROI 112, the data may be augmented, in some embodiments, from a second or additional scan that, for example, includes a more complete set of viewing angles of the sample 104. In some embodiments, the additional scan may be of lower resolution and may include the full sample within its field of view. For example, a first scan using a longer FOD and a full trajectory may be performed in addition to a second scan using a shorter FOD and an adjusted trajectory. Additionally or alternatively, the FOD of the second scan may be dynamically adjusted during the scan, e.g., a variable FOD. The FDD may also be adjusted to maintain geometric magnification, or it may remain constant. In some embodiments, the first scan may be a low magnification scan and the second scan may be a higher magnification scan. Additionally, a workflow for implementing the scanning trajectory for the ROI 112 may include making a low magnification scan, determining an ROI from the low magnification scan, then performing the high magnification scan using the adjusted trajectory/restricted viewing angles and shorter/variable FOD.

FIG. 1C is an example sample trajectory 101, and illustrates conventional micro-CT scanning. For example, the scan trajectory may include a circle or helical trajectory with the FOD measured from the axis of rotation of the sample 104 to the source, labeled as FOD SAMPLE in the Figure. The source 102 is located at the dashed circle 114A, which represents scan trajectory 114A. As the relative rotational motion of the sample 104 with respect to the source 102/detector 106 pair progresses, the distance of FOD SAMPLE will not change, but will be constant. The scan trajectory may complete a full rotation or an arc greater than 180° around the sample 104 if 2D, or may complete a helical motion or a loci of points, e.g., a space filling trajectory, around the sample 104 if 3D.

Figure 1D:
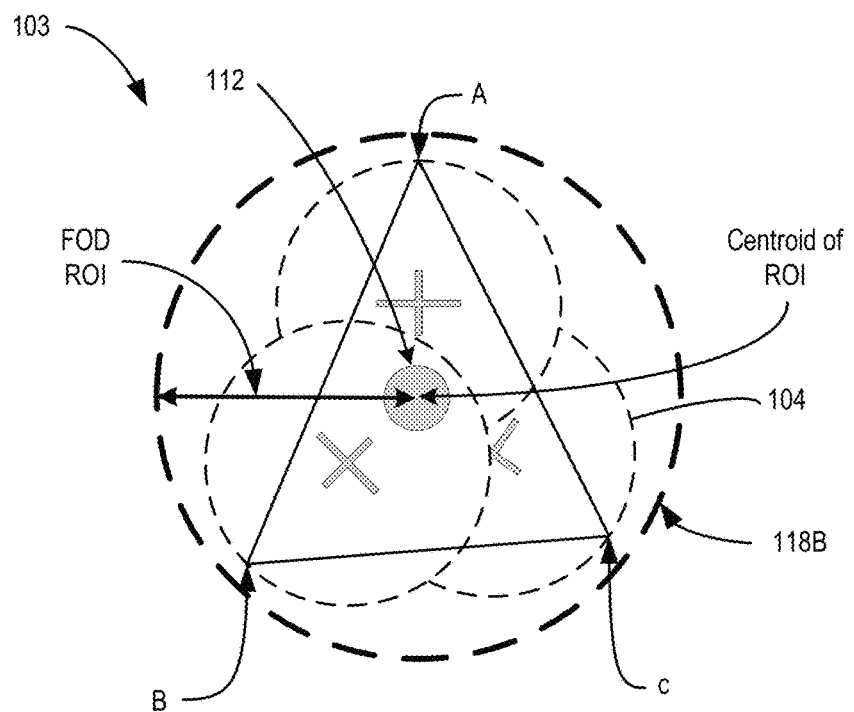
FIG. 1D is an example ROI-based trajectory, and illustrated conventional microCT ROI scanning.

FIG. 1D is an example ROI-based trajectory 103, and illustrates conventional micro-CT ROI scanning. Conventional ROI scanning proceeds with mounting the sample 104 such that the relative rotation of the sample 104 and the source 102/detector 106 pair is centered on a centroid of the ROI 112, instead of the axial center of the sample 104. As such, the rotation of the sample 104 with respect to the source 102/detector 106 pair results in the sample 104 wobbling around the ROI 112 as shown by the dashed lines. As such, the ROI trajectory 114B must be adjusted to account for the movement of the sample 104, and may end up being larger than the sample trajectory of FIG. 1C. The FOD ROI distance must be set to avoid collisions between the sample 104 and the source 102. The detector 106 must also be placed to avoid collisions, but is not shown in FIG. 1C or 1D.

One way to determine a minimum distance for ROI-centric FOD in accordance with the present disclosure is to determine a circumradius of the sample 104 when rotating centered on the ROI 112. The circumradius is defined as the radius of a circle that intersects the three points of the triangle designated by points A, B, and C, as shown in FIG. 1D. It should be noted that the location of the ROI within the sample will affect the circumradius of the sample, along with the size of the sample.

As discussed above, one criterion for minimizing the FOD ROI is to select only those viewing angles that have a mean square FOD distance that is less than the circumradius of the sample 104. For example, a scan of the ROI may only use viewing angles on a side of the sample where the ROI is closest to the surface, such as along an arc centered on the sample where the ROI is closes to the surface. By minimizing the FOD ROI, the scan trajectory efficiency is increased, which results in higher quality scans of the ROI.

Figure 1E:
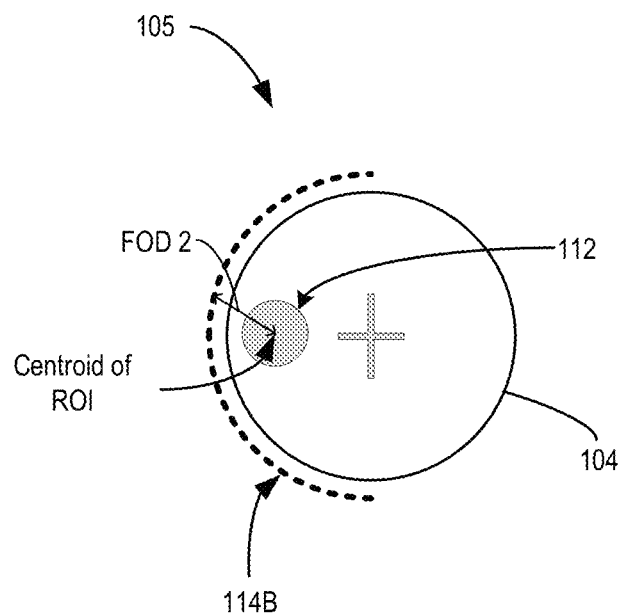
FIG. 1E illustrates a scan including a set of viewing angles for increasing scan trajectory efficiency and minimizing ROI-based FOD in accordance with an embodiment of the present disclosure.

FIG. 1E illustrates a scan 105 including a set of viewing angles for increasing scan trajectory efficiency and minimizing ROI-based FOD in accordance with an embodiment of the present disclosure. The scan 105 includes a scan trajectory 114B for maximizing scan trajectory efficiency. The scan trajectory efficiency may be maximized by using viewing angles that minimize the ROI-based FOD, e.g., FOD 2. The viewing angles of the scan trajectory 114B may be a limited set of viewing angles out of all possible viewing angles (see trajectory 118B of FIG. 1D for one example of a complete set of possible viewing angles). One threshold to ensure that the selected viewing angles have a minimized FOD may be to use the circumradius of the sample 104 when mounted as in FIG. 1D as a minimum desired FOD. Then, based on the minimum, a plurality of viewing angles may be selected that have a calculated mean square FOD distance that is less than the minimum. For example, the implemented scan trajectory 114B for a 2D scan may only be an arc around the sample 104, with the arc centered on the area of the sample where the ROI 112 is closes to the surface.

It should also be noted that by limiting the scan trajectory 114B as shown results in a variable ROI-based FOD compared to the conventional shown in FIG. 1D. To illustrate, as the source 102 moves along the trajectory 114B, the distance between the source 102 and the centroid of the ROI 112 increases and decreases. While some of the viewing angles will have associated FODs that are longer than other viewing angles, the viewing angles selected for the reduced trajectory scan will have a mean square FOD distance that is less than the minimum FOD. As such, the reduced FOD 2 compared to the FOD ROI of FIG. 1D results in a maximized scan trajectory efficiency and improved image quality.

Figure 1F:
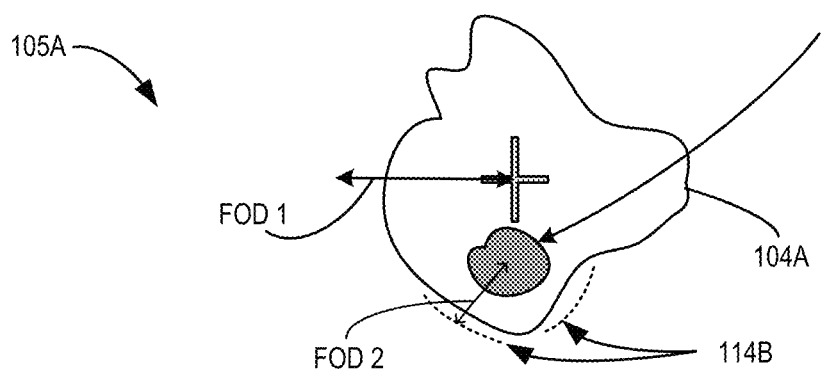
FIG. 1F illustrates a scan for a misshapen sample in accordance with an embodiment of the present disclosure.

FIG. 1F illustrates a scan 105A for a misshapen sample in accordance with an embodiment of the present disclosure. The scan trajectory 114B of scan 105A may be selected to minimize FOD 2 and may only include viewing angles as represented by the two dotted lines. As shown, the scan trajectory may not need to make a complete pass over the ROI, but may only include viewing angles that minimizes the associated FOD, especially the mean square of the FOD 2 distance.

In some embodiments, the time spent at each viewing angle may be adjusted based on their associated FOD. For example, if the scan 105 includes viewing angles that do not fully satisfy the minimum definition, then the viewing angles that do satisfy the minimum definition may have an associated longer viewing time than those that do not satisfy the definition.

Figure 2C:
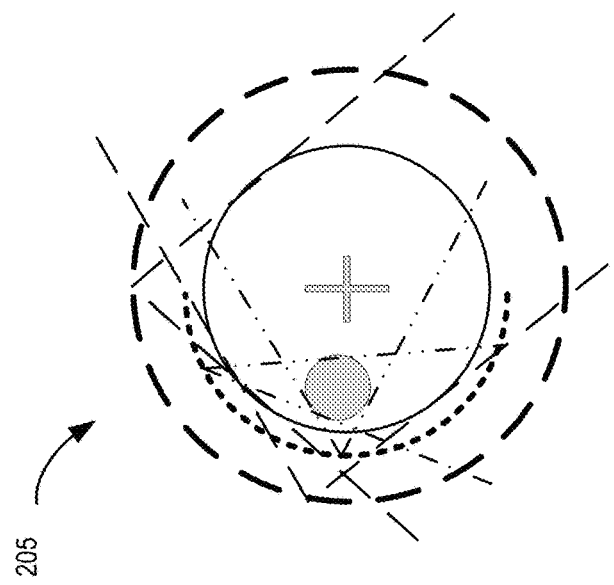
FIGS. 2A through 2C show example scans in accordance with an embodiment of the present disclosure.
Figure 2B:
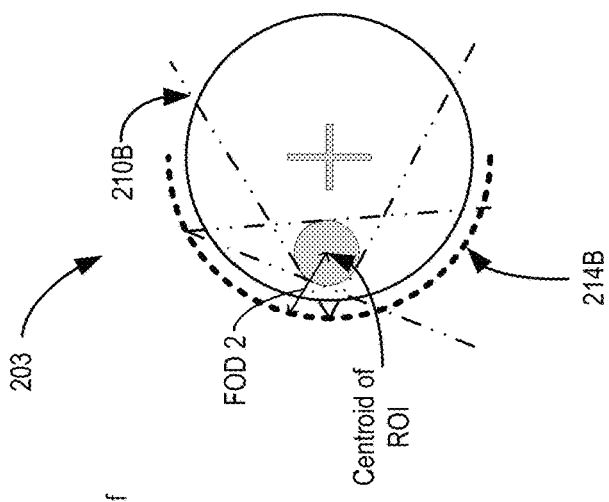
Figure 2A:
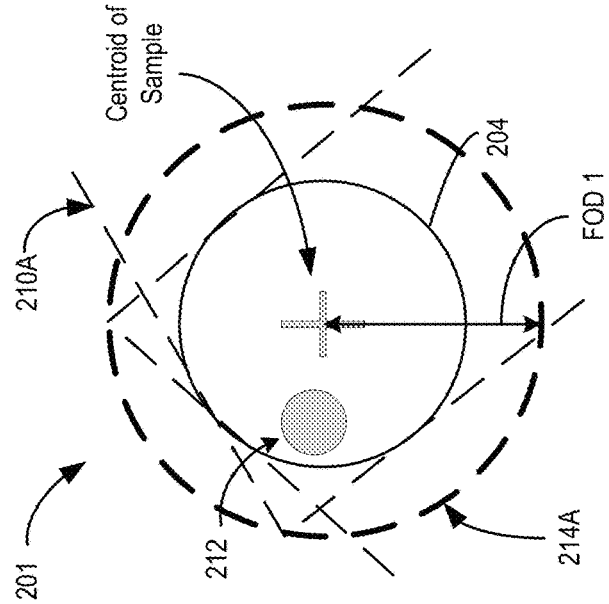

FIGS. 2A through 2C show example scans 201, 203, and 205, respectively, in accordance with an embodiment of the present disclosure. The scans 201 and 203 show a sequence of scans performed to obtain low resolution data of an entire sample 204, then high resolution data of an ROI 212. The scans 201 and 203 may, for example, be performed by the CT system 100. The scan 205 shows the combination of the scans 201 and 203 and is included for illustrative purposes only. The scan data obtained during each scan may be combined to provide a single high resolution data set free of artifacts. For example, the high resolution data may contain reasonably complete high resolution information, but the low resolution radiographs are needed to allow the reconstruction algorithm to converge in reasonable time to a good solution that is free of artifacts. In other embodiments the high resolution data might be incomplete, so in this case the low resolution scan data may be used to minimize the artifacts and the loss of resolution. In other embodiments, however, only the scan 203 may be performed to obtain high quality scans of ROI 212. For clarity, the source and detector are not shown, but the source would be located at the trajectory position (bold dotted/dashed lines in FIGS. 2A-2C) and aimed to maximize flux through the ROI, whereas the detector may be located at a similar distance or further back from the sample 204.

The scan 201 may be a relatively low magnification scan. In some embodiments, scan 201 includes a circular trajectory 214A that completes a scan of the sample 204 from a relatively complete set of viewing angles at a first FOD, e.g., FOD 1. FOD 1 may be the distance from the source, which would be located at trajectory 214A, and the center of the sample 204.

The scan 203 may be a relatively high magnification scan. In some embodiments, scan 203 includes an adjusted or limited trajectory (e.g., with a reduced set of viewing angles) and is performed at a variable FOD, e.g., FOD 2, which may be minimized based on a circumradius of the sample 204, and may be generally shorter than FOD 1. FOD 2 is the distance from the source, which would be located at trajectory 214B, and the (center) of ROI 212, and which may change based on the viewing angles implemented in the trajectory 214B. The scan 203 includes the trajectory 214B, which may in general be less than an entire revolution of the sample 204, and includes a reduced set of viewing angles, at least with respect to trajectory 214A. In some embodiments, the viewing angles of the trajectory 214B may be selected based on the minimized FOD 2, such that the mean square FOD distance associated with the selected viewing angles is less than the minimum FOD. In other embodiments, FOD 2 is less than FOD 1. In either instance, the viewing angles implemented in scan 203 may be selected to improve the scan efficiency of ROI 212.

In some embodiments, the trajectory 214B covers around 180° of rotation around the sample 204. The trajectory 214B may cover 180° of rotation with an additional arc to cover the cone angle. In some embodiments, the trajectory 214B may be adjusted to obtain as much coverage of the ROI 212 as possible while centering the ROI 212 in the desired FOV and while minimizing FOD 2 within the constraints of the shape and size of the sample 204. By limiting the range of the trajectory 214B, FOD 2 may be dynamically reduced during the scan 203 so that more x-ray flux passes through ROI 212 and is incident on the detector, which may result in a higher quality scan of at least the ROI 212. In some embodiments, the FOD 2 may be varied during the scan 203, and in such an embodiment, the FDD may also change to maintain magnification during FOD changes. In embodiments where the FOD is defined as the distance between the source and the ROI 212, the FOD may change as the ROI 212 changes (e.g., due to movement of the sample or source) so to minimize FOD 2.

The scan 205 shows the relative locations and lengths of the trajectories 214A and 214B. The scan data based on the two trajectories may be combined to reconstruct a single high-quality high-resolution view of ROI. Stated another way, the combination of the scan data may allow a user to zoom into the ROI 212 from the low resolution data to the high resolution data. In some embodiments, the low resolution scan data may be used to fill in some missing data from the high resolutions scan, which may occur during the reconstruction process.

Figure 3B:
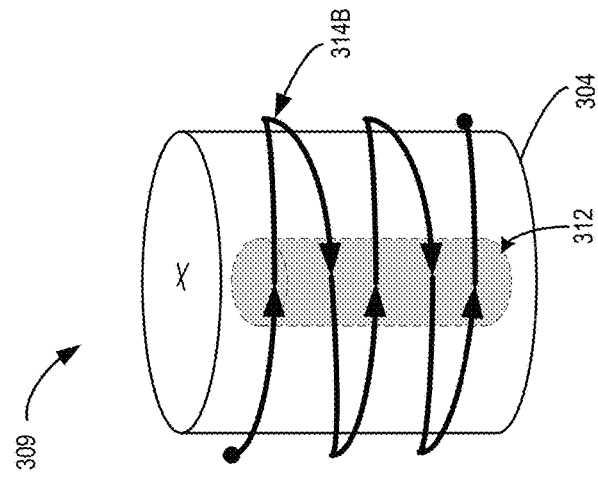
FIGS. 3A and 3B are example three-dimensional scans in accordance with an embodiment of the present disclosure.
Figure 3C:
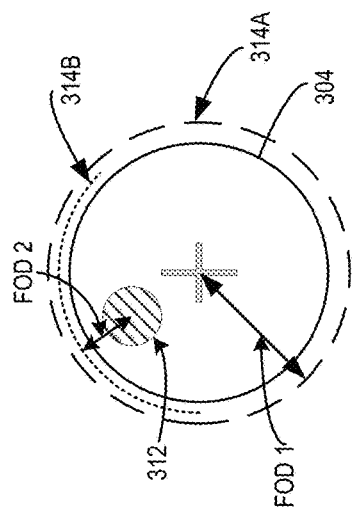
FIG. 3C shows a plan view of sample to show the location of ROI in accordance with an embodiment disclosed herein.
Figure 3A:
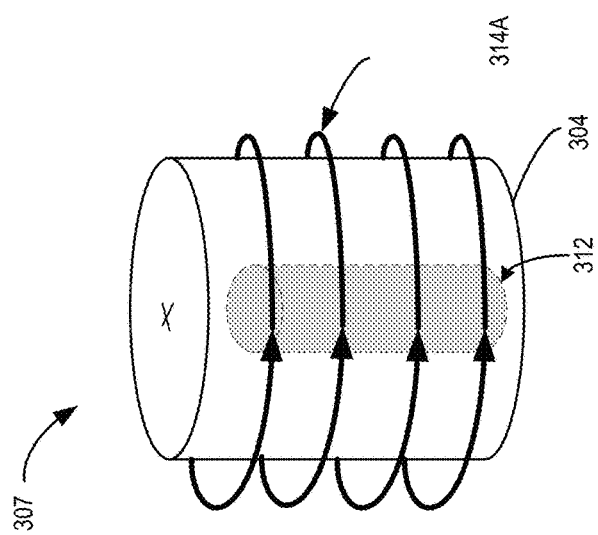

FIGS. 3A and 3B are example three-dimensional scans 307 and 309, respectively, in accordance with an embodiment of the present disclosure. FIG. 3C shows a plan view of sample 304 to show the location of ROI 312 within the sample 304. The scans 307 and 309 may be performed by a CT system, such as the CT system 100. Similar to the samples 104 and 204, the sample 304 includes an ROI 312 that is eccentrically located. As such, a first scan of low resolution using trajectory 314A may be performed first, then an adjusted or localized scan using trajectory 314B may then be performed. However, in some embodiments, only the scan 309 may be performed to obtain image data of ROI 312. The trajectory 314A being performed at a first FOD, FOD 1, that may be larger than FOD 2 used for trajectory 314B. FOD 2 may be based on the subject of the scan, and may be dynamically changed in some embodiments. For example, FOD 1 may be the distance from the source, which may be located at the trajectory 314A, to the center of the sample 304, whereas FOD 2 may be the distance from the source, e.g., located at trajectory 314B, to the center of ROI 312. During scan 309, for example, FOD 2 may vary due to the changing distance between the source and the ROI 312.

In some embodiments, the trajectory 314A may be helical shaped. As such, the sample 304 or the source/detector pair may be translated in a +/−Z direction while revolving. Once the ROI 312 is determined, the trajectory 314B may be performed to obtain higher magnification data of the ROI based on selecting viewing angles that have associated FODs that are either less than FOD 1 or have a combined value that is less than a minimum FOD, as previously defined. In some embodiments, the trajectory 314B may be a zig zag pattern of arcs or a lattice-type space-filling trajectory. The lattice-type space-filling trajectory includes an array of points where projections are obtained over an area of the sample 304. In general, scan data may be obtained in accessible regions (e.g., changes in Z, theta, and FOD 2) of space around a portion of the sample 304 where the FOD 2 is allowed to vary throughout the trajectory while maintaining the minimum requirement. In some embodiments, the trajectory 314B may include arcs that cover 180° of revolution plus the cone angle. While the scans 307 and 309 are discussed using specific trajectories, all contemplated trajectories fall within the bounds of this disclosure.

FIG. 4 is an example method 409 for performing CT scanning of an ROI in a sample in accordance with an embodiment disclosed herein. The method 409 may be performed by a CT system, such as the CT system 100 for example. The method 409 may include processes for minimizing focus object distances for ROI-based scanning. Such processes, for example, may select viewing angles based on the location of the ROI within the sample and further based on a shape of the sample. In some embodiments, the sample may be mounted on a stage of the CT system such that the ROI is aligned with an axis of rotation. In such an instance, the relative rotation of the sample with respect to the source and detector of the CT system may limit the FOD to avoid collisions between sample and source/detector. However, the disclosed technique allows for minimizing the FOD through selection of viewing angles that allow for the minimized FOD. The minimization of the FOD through the selection of viewing angles is also applicable with eccentric ROIs as well.

The method 409 may begin at process block 411, which includes selecting a first plurality of viewing angles based on a location of a region of interest within a sample where a relationship between the first plurality of viewing angles and the location of the region of interest within the sample allows for the minimization of a first focus object distance.

Process block 411 may be followed by process block 413, which includes scanning the region of interest within the sample with a first scan trajectory at the first focus object distance. In some embodiments, the first focus object distance may be variable and a length of the first focus object distance based on the region of interest, at least with respect to a shape of the sample, and its location within the sample. The first scan trajectory will include the first plurality of viewing angles. The process block 413 may be followed by process block 415, which includes minimizing the first focus object distance for at least one viewing angle of the first plurality of viewing angles. Of course, other numbers of viewing angles of the first plurality of viewing angles may be minimized as well. In some embodiments, the first plurality of viewing angles may be limited to those viewing angles that allow for the minimization of the first focus object distance and other viewing angles may be omitted or restricted out of the first scan trajectory.

In some embodiments, the restricted viewing angles may have associated focus object distances that are greater than a focus object distance of another scan (process block 417, which is optional). The other scan, which is also optional, may be performed with a second scan trajectory that includes a mostly complete set of viewing angles at a second focus object distance greater than the first focus object distance. This other scan may be a low magnification scan of the entire sample and the second focus object distance may be greater than the first to accommodate sample shape.

In some embodiments, the first may be a high magnification scan of the ROI, whereas the second scan may be a low magnification scan of the entire sample. Additionally, the data from the first and second scans may be combined to provide context to the ROI-based scan.

FIG. 5 is an example method 501 for ROI scanning using a reduced set of viewing angles in accordance with an embodiment of the present disclosure. The method may be implemented on a CT system, such as system 100, and provide reconstructions based on the ROI scans. The method 501 may begin at process block 503, which includes determining a first FOD based on a circumradius of a sample, the sample including the ROI. The circumradius may first be determined based on a location of the ROI within the sample. For example, the sample is mounted to rotate with the ROI on the axis of rotation, and then a circumradius is determined based on the outer circumference generated by the wobbly rotation of the sample. Three points along the circumference may define the circumradius. The location of the ROI within the sample may affect the size of the circumradius due to changing the movement of the sample. Additionally, the first focus object distance may set an outer boundary of any viewing angles used based on their FOD being greater than the first FOD.

The process block 503 is followed by process block 505, which includes determining a second focus object distance based on a radius of a smallest cylinder that contains the region of interest. In some embodiments, the smallest cylinder that contains the ROI may be a virtual cylinder having a radius equal to that of the ROI. As such, the second FOD may be unobtainable due to it being located within the sample. As such, a minimum second FOD may be a distance from the ROI to a closest surface of the sample. While this may be a minimum possible FOD, to avoid collision between sample and source, a slightly longer FOD may be used during acquisition of images.

The process block 505 may be followed by process block 507, which includes determining a plurality of viewing angles from a plurality of possible viewing angles in response to the first focus object distance, wherein each viewing angle of the plurality of viewing angles has an associated focus object distance measured from the region of interest, and wherein the associated focus object distance of each of the plurality of viewing angles is less than the first focus object distance and greater than the second focus object distance. In some embodiments, the plurality of viewing angles will be selected based on a mean square FOD distances of their associated FODs being less than the first FOD. As such, selecting the viewing angles includes continuously updating the mean square FOD calculation and comparing the calculation to the minimum FOD. If a viewing angle is selected that causes the mean square FOD calculation to increase above the minimum, then that viewing angle may be deselected and set aside as not providing a desired FOD. In some embodiments, the mean square FOD distance may further be weighted by the time spent obtaining data at each of the selected viewing angles. While it may be desirable to only use viewing angles that satisfy this relationship during a scan, the inclusion of other, e.g., viewing angles with longer FODs, is allowable if desired. In general, the selected viewing angles are those having the shortest FOD with relation to the location of the ROI within the sample. The process block 507 is followed by process block 509, which includes scanning the ROI using the plurality of viewing angles.

Figure 6:
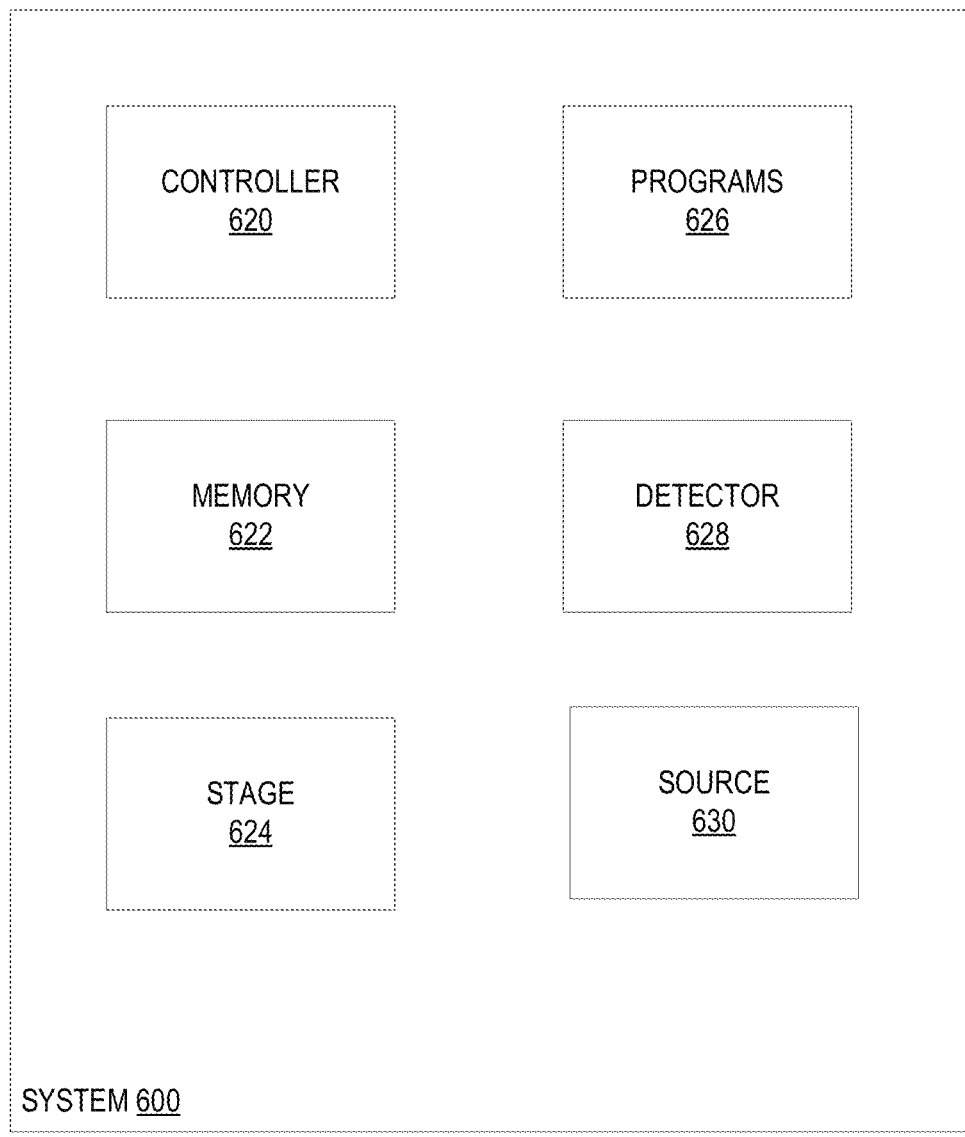
FIG. 6 is an example functional block diagram of a CT system in accordance with an embodiment of the present disclosure.

FIG. 6 is an example functional block diagram of a CT system 600 in accordance with an embodiment of the present disclosure. The CT system 600 may be an example of the CT system 100, and may be used to obtain CT scans of samples and provide projections of various slices and areas of the sample. The CT system 600 may at least include a controller 620, memory 622, stage 624, programs 626, detector 628, and source 630. In general, the CT system 600 may perform scans of samples as described herein.

The controller 620 may be a micro controller, a CPU, one or more computing cores, or the like. The controller 620 may control multiple aspects of the CT system 600 and may be coupled to receive data from and provide control signals to the various other components of the CT system 600. For example, the controller 620 may execute code stored in programs 626 to cause the CT system 600 to perform low and high magnification scans of a sample using different trajectories at different FODs. Additionally, scan data obtained by the detector 628 may be provided to the controller 620. In response, the controller 620 may perform algorithms on the data to provide CT scans, projections, etc. The algorithms, as noted, may be part of the programs 626.

The memory 622 may be volatile or non-volatile memory coupled to hold data and instructions. The programs 626, which may be a portion of the memory 622, may include operating instructions and code for performing the various tasks of the CT system 600, such as controlling a stage, a source, and a detector, along with various other ancillary components.

The stage 624 may support the sample and provide movement thereof in response to control signals provided by the controller 620. The control signals may be generated by the controller 620 while executing stage control instructions stored in memory 622 and/or programs 626. For example, the stage control may cause the stage to move in accordance to a desired trajectory, such as a helix or a zig zag pattern, for example.

The detector 628 may detect x-rays having passed through the sample and record their intensity. The intensity of the x-rays may be reduced due to attenuation from passing through the sample. The amount of attenuation may be the data used to image the sample and for generating reconstructions. The image data, or scan data, may be provided to the controller 620 for processing, or stored in memory 622 for later processing. Additionally, the detector 628 may be moved in response to control signals from the controller 620 to adjust an FDD. The FDD may be adjusted to account for sample shape, size, or to obtain a desired FOV.

The source 630 provides the x-rays to the sample and may be controlled by the controller 620. For example, the source 630, in response to control signals from the controller 620, may generate x-rays at a desired intensity and may also move in a direction with respect to the sample. The movement of the source 630 may be performed to adjust an FOD of the CT system 600. The FOD may be adjusted to account for sample shape, size, or to obtain a desired FOV.

The embodiments discussed herein to illustrate the disclosed techniques should not be considered limiting and only provide examples of implementation. Those skilled in the art will understand the other myriad ways of how the disclosed techniques may be implemented, which are contemplated herein and are within the bounds of the disclosure.

What is claimed is:

1. A method comprising:
   determining a first focus object distance based on a circumradius of a sample, the sample including a region of interest;
   determining a second focus object distance based on a radius of a smallest cylinder that contains the region of interest;
   determining a plurality of viewing angles from a plurality of possible viewing angles in response to the first focus object distance, wherein each viewing angle of the plurality of viewing angles has an associated focus object distance measured from the region of interest, and wherein the associated focus object distance of each of the plurality of viewing angles is less than the first focus object distance and greater than the second focus object distance; and
   scanning the region of interest using at least the plurality of viewing angles.

2. The method of claim 1, wherein determining a plurality of viewing angles from a plurality of possible viewing angles in response to the first focus object distance includes selecting the plurality of viewing angles based on a mean square of their associated focus object distances being less than the first focus object distance.

3. The method of claim 2, wherein the mean square of their associated focus object distances is weighted by a time spent scanning at each viewing angle of the plurality of viewing angles.

4. The method of claim 1, further comprising excluding a subset of the plurality of possible viewing angles from scanning the region of interest based on the subset of the plurality of possible viewing angles having an associated focus object distance that cannot be minimized with respect to the second focus object distance.

5. The method of claim 1, wherein the plurality of viewing angles are implemented in a scan trajectory selected from one of a zig zag, a subset of a helix, and a lattice-type space-filing trajectory.

6. The method of claim 1, wherein the plurality of viewing angles are implemented in a scan trajectory that is an arc.

7. The method of claim 1, wherein the plurality of viewing angles are implemented in a scan trajectory that includes a discontinuous locus of viewing angles.

8. The method of claim 1, further comprising:
   selecting the plurality of viewing angles based on a location of the region of interest within the sample, wherein a relationship between the plurality of viewing angles and the location of the region of interest within the sample allows for minimization of the first focus object distance.

9. The method of claim 1, wherein the plurality of viewing angles are selected to minimize their associated focus object distances with respect to a location of the region of interest within the sample.

10. The method of claim 1, wherein scanning the region of interest using at least the plurality of viewing angles further includes one or more viewing angles from the plurality of possible viewing angles that have associated focus object distances greater than or equal to the first focus object distance.

11. A system for performing computed tomography scans, the system comprising:
   a stage for holding and moving a sample;
   a source for providing a beam of x-rays to the sample;
   a detector for detecting at least a portion of the beam of x-rays after having passed through the sample; and
   a controller at least coupled to the stage for controlling a movement of the stage, the controller coupled to or including executable code that, when executed by the controller, causes the system to:
      determine a first focus object distance based on a circumradius of a sample, the sample including a region of interest;
      determine a second focus object distance based on a radius of a smallest cylinder that contains the region of interest;
      determine a plurality of viewing angles from a plurality of possible viewing angles in response to the first focus object distance, wherein each viewing angle of the plurality of viewing angles has an associated focus object distance measured from the region of interest, and wherein the associated focus object distance of each of the plurality of viewing angles is less than the first focus object distance and greater than the second focus object distance; and
      scan the region of interest using at least the plurality of viewing angles.

12. The system of claim 11, wherein the executable code that causes the controller to determine a plurality of viewing angles from a plurality of possible viewing angles in response to the first focus object distance further includes executable code that, when executed by the controller, causes the system to:
   select the plurality of viewing angles based on a mean square of their associated focus object distances being less than the first focus object distance.

13. The method of claim 12, wherein the mean square of their associated focus object distances is weighted by a time spent scanning at each viewing angle of the plurality of viewing angles.

14. The system of claim 11, further comprising executable code that, when executed by the controller, causes the system to:
   exclude a subset of the plurality of possible viewing angles from scanning the region of interest based on the subset of the plurality of possible viewing angles having an associated focus object distance that cannot be minimized with respect to the second focus object distance.

15. The system of claim 11, wherein the plurality of viewing angles are implemented in a scan trajectory selected from one of a zig zag, a subset of a helix, and a lattice-type space-filing trajectory.

16. The system of claim 11, wherein the plurality of viewing angles are implemented in a scan trajectory that is an arc.

17. The system of claim 11, wherein the plurality of viewing angles are implemented in a scan trajectory that includes a discontinuous locus of viewing angles.

18. The system of claim 11, further comprising executable code that, when executed by the controller, causes the system to:
   select the plurality of viewing angles based on a location of the region of interest within the sample, wherein a relationship between the plurality of viewing angles and the location of the region of interest within the sample allows for minimization of the first focus object distance.

19. The system of claim 11, wherein the plurality of viewing angles are selected to minimize their associated focus object distances with respect to a location of the region of interest within the sample.

20. The system of claim 11, wherein the executable code that causes the controller to scan the region of interest using at least the plurality of viewing angles further includes executable code that, when executed by the controller, causes the system to:
    scan the region of interest with one or more viewing angles from the plurality of possible viewing angles that have associated focus object distances greater than or equal to the first focus object distance.

* * * * *

UNITED STATES PATENT AND TRADEMARK OFFICE
CERTIFICATE OF CORRECTION

PATENT NO. : 11,009,449 B2  
APPLICATION NO. : 16/359352  
DATED : May 18, 2021  
INVENTOR(S) : Glenn Myers et al.

It is certified that error appears in the above-identified patent and that said Letters Patent is hereby corrected as shown below:

In the Claims

In Column 16, Claim 13, Line 32, delete "the method of claim 12," and insert -- the system of claim 12, --, therefor.

Signed and Sealed this
Twenty-seventh Day of June, 2023

Katherine Kelly Vidal
*Director of the United States Patent and Trademark Office*